April 26, 1932.  T. R. HARRISON  1,855,757
METERING SYSTEM
Filed July 27, 1929
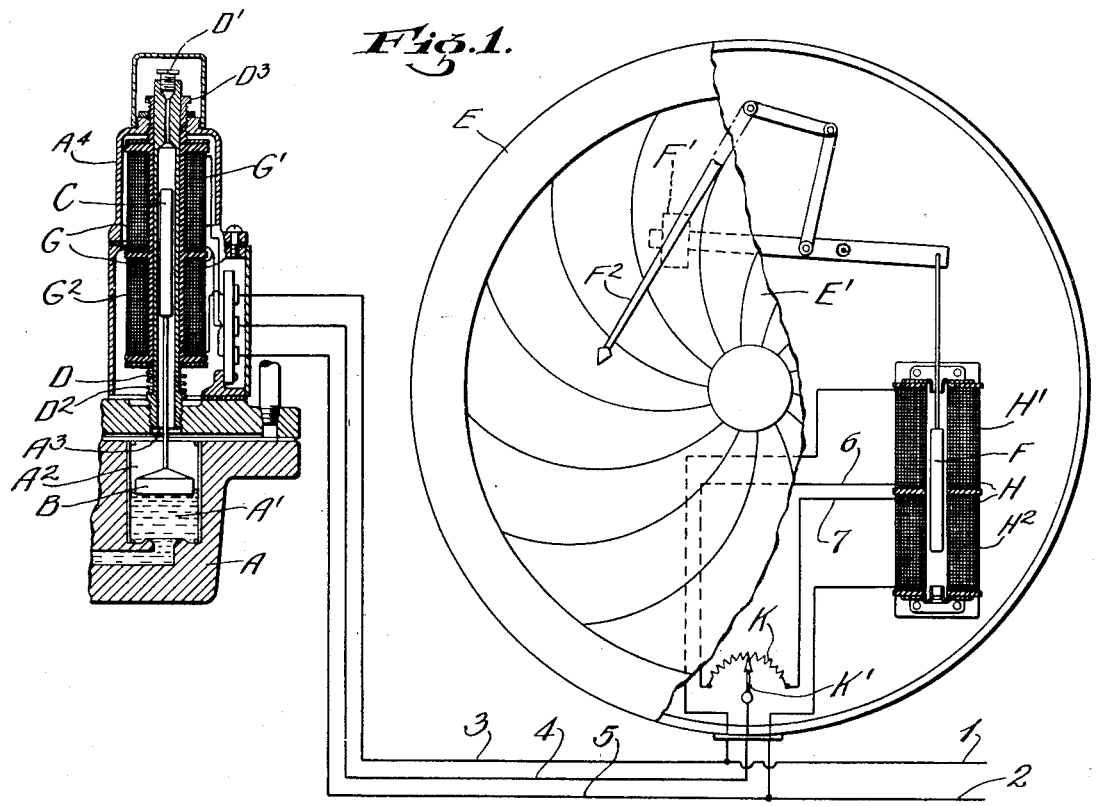
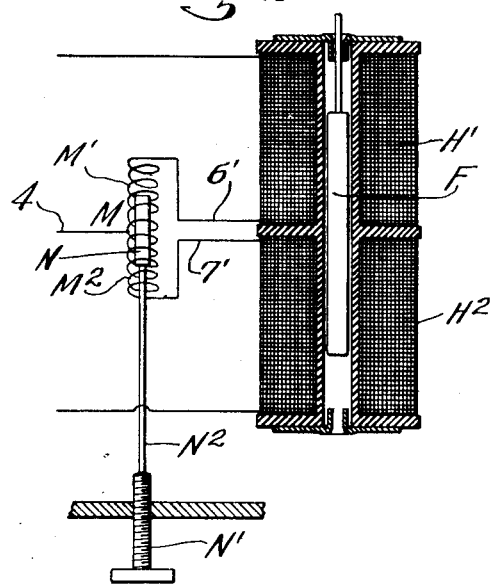
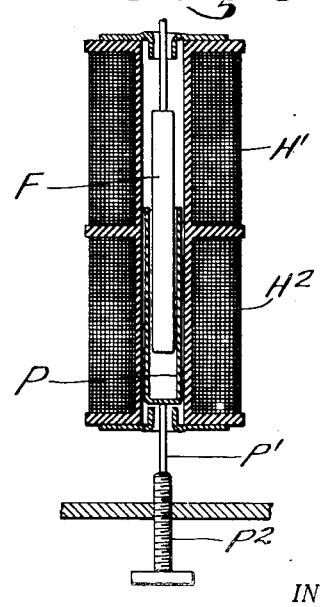
INVENTOR.
THOMAS R. HARRISON
BY John E. Hubbell
ATTORNEY Patented Apr. 26, 1932

1,855,757

UNITED STATES PATENT OFFICE

THOMAS R. HARRISON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA

METERING SYSTEM

Application filed July 27, 1929. Serial No. 381,624.

The present invention relates to apparatus such as distant metering systems comprising transmitting and receiving elements connected to form a self-balancing impedance bridge of the type disclosed and claimed in Patent No. 1,743,852, granted on my prior application Serial No. 106,346, filed May 3, 1926. In such apparatus, any relative movement of a magnetic body forming a part of the transmitting element relative to coils also forming a part of that element, changes the impedance ratio of the last mentioned coils, and thereby unbalances the bridge. This results in a relative movement of a magnetic body and coils forming parts of the receiving element which rebalances the bridge, by producing a change in the impedance ratio of the last mentioned coils corresponding to and compensating for the change in the impedance ratio of the coils of the transmitting element produced by the relative movement of its parts.

The general object of the present invention is to improve apparatus of the type referred to by incorporating in the receiver element simple and effective provisions for adjusting the impedance relation of the receiver element coils and thereby varying the balancing position which the magnetic body of the receiving element must assume relative to the coils of that element, when the magnetic body of the transmitting element occupies a particular position relative to the coils of the last mentioned element. The invention is of especial utility for use in calibrating or recalibrating the apparatus, so as to insure that the receiving element magnetic body will be properly positioned with respect to the receiving element coils in the zero position of the magnetic body of the transmitting element relative to the coils of that element. In the use of apparatus of the character described in a distant flow metering system, for example, in which the magnetic body of the transmitting element is adjusted by changes in level of a sealing liquid, as mercury, in a manometer, changes in the amount of sealing liquid in the manometer as well as other changes may alter the position of the magnetic body relative to the coils of the transmitting element in the zero flow condition. The use of the receiver element adjusting provisions of the present invention permits of a ready calibration or recalibration to compensate for any such change in the relative position of the magnetic body and coils of the transmitting element in the zero flow condition of the latter.

In the preferred mode of carrying out the present invention, the adjusting provisions associated with the receiving element, may comprise means for adjusting the relative ohmic resistances, or the reactance of portions of the receiver coils included in different branches of the bridge circuit, or for varying the position of what may be called a magnetic shunt to thereby vary the impedance ratio of the coils of the receiving element.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of the invention.

Of the drawings:—

Fig. 1 is a diagrammatic view of one embodiment of my invention;

Fig. 2 is a view of part of the apparatus of Fig. 1 showing a modified construction and arrangement; and Fig. 3 is a view showing another modification.

In the drawings, and particularly in Fig. 1, I have illustrated a portion of a metering system comprising a transmitting element including a manometer A of the differential pressure type and having inter-connected high and low pressure chambers adapted to be connected to the high and low pressure sides, respectively, of a pressure differential creating device, such as an orifice plate located in an adjacent fluid conduit. Such arrangements are well known in the art as shown, for example, in my prior application previously referred to, and illustration here is deemed unnecessary. As is customary, the manometer chambers are partially filled with a sealing liquid A', such as mercury. A metallic float B in the high pressure chamber A² is moved up and down by the sealing liquid as the level thereof in the chamber A² rises and falls. The upper end of the float is connected through a non-magnetic stem B' to a magnetic body or armature C, which is axially movable in and guided by a vertically positioned pressure-tight tube D of non-magnetic material. The lower end of the tube D opens into the high pressure chamber A². As shown the tube D is removably mounted in a threaded opening A³ formed for that purpose in the manometer A and has its upper end restricted and closed by a threaded plug D'.

The exhibiting mechanism which is shown as a recording instrument E, comprises an axially movable magnetic body or armature F, which is moved in accordance with the movements of the armature C, by electro-magnetic transmitting means. The electro-magnetic transmitting means comprise an impedance bridge system which includes a transmitter coil G divided into two superposed end to end coil sections G' and G² surrounding the tube D. The coil sections are resiliently supported on the tube D by a coiled spring D² surrounding the lower end of the tube. An externally threaded sleeve D³, positioned on the upper end of the tube and in threaded engagement with a cover A⁴ surrounding the coil sections and tube, contacts with the upper end of the coil section G'.

The impedance bridge also includes a receiver coil H which is similarly divided into a pair of superposed end to end coil sections H' and H² surrounding the axially movable receiver armature F. Each pair of coil sections are connected in series between alternating current supply conductors 1 and 2 and the coil sections G' and G² are connected in parallel with the coil sections H² and H', respectively, by conductors 3, 4 and 5, the sections of each coil being energized in the same direction so that magnetic poles of opposite polarity are created at the remote and adjacent ends of each pair of coil sections. The receiver armature F is counter-balanced by a weight F', and connected through a suitable lever system to a pen F² which records the movements of the armature on a meter chart E'.

With the construction described, the float B and armature C move upward in response to an increase in level of the mercury in the high pressure chamber, thereby increasing the inductance of the coil section G' and decreasing the inductance of the coil section G². These changes in the impedance values of the coil sections result in a decrease in current flow in the coil section G' and the corresponding receiver coil section H² and an increase in current flow in the coil sections G² and H'. The increase in current flow in the receiver coil section H' relative to the current flow in the section H² causes the armature F to move upwardly until the opposing magnetic interactions between the armature and the individual coil sections are equal to one another in intensity. This condition is reached when the ratio of the inductances of the coil sections H' and H² equals the ratio of the inductances of the coil sections G' and G². The bridge is then rebalanced and in the balanced condition of the bridge no current flows through the conductor 4. In a similar manner, other movements of the transmitter armature C produce corresponding movements of the receiver armature F.

A characteristic feature of operation of the metering system described is that in the balanced condition of the impedance bridge the impedance ratio of the receiver coil sections H' and H² must be the same as the impedance ratio of the transmitter coil sections G' and G². This operating characteristic is utilized or taken advantage of in providing the apparatus with the novel calibrating or recalibrating provisions.

In the form of the invention shown in Fig. 1, a rheostat K is incorporated in the conductor connecting the end to end coil sections H' and H² in series. The common conductor 4 is shown with an adjustable contact arm K' at its end adjacent the receiver, the arm being movable across the rheostat to increase the resistance of the coil section H' and decrease the resistance of the coil section H² and vice versa. Conductors 6 and 7 connect the ends of the rheostat K with the adjacent ends of the receiver coil sections H' and H², respectively.

When an error in the instrument zero flow reading occurs and of the type heretofore described, the inductance and impedance of the coil section H² increases relative to the inductance and impedance of the coil section H'. To restore the receiver armature to its proper zero flow position with the impedance ratio between the coil sections H' and H² in that position the same as the impedance ratio of the coil sections G' and G², the arm K' is moved to the left from a neutral position to increase the resistance of the coil section H² and correspondingly decrease the resistance of the coil section H'. The bridge is then unbalanced and the current flow in the coil section H' increased. The increased current flow increasing the electro-magnetic action of the coil section H' on the armature F and the latter moves upwardly as a result thereof. The restoring movement of the armature F produces a corresponding change in the relative inductances of the coil sections H' and H² and when the armature F is in its proper zero position the impedance ratio of the coil sections H' and H² is reestablished the same as that of the coil sections G' and G². This adjustment of the armature zero position is effective throughout the operating range of the meter mechanism and insures accurate readings at all points.

In Fig. 2 a modified form of adjusting means is illustrated in which the zero position of the armature F in the receiver coil sections is changed by directly varying the inductances of the coil sections. In this arrangement an auxiliary divided coil M is substituted for the rheostat K. The common conductor 4 is connected to the mid-point of the coil M, thereby forming coil sections M' and M², the remote ends of the sections M' and M² being connected to the adjacent ends of the receiver coil sections H' and H², by conductors 6' and 7', respectively. An auxiliary armature N is positioned in the coil M and is axially movable therein by an adjusting screw N' connected to the armature by a non-magnetic stem N².

With the arrangement of Fig. 2 the armature F can be raised to its normal zero position by increasing the inductance of the auxiliary coil section M² which forms in effect part of the coil section H² and thus unbalancing the bridge. The increase in current flow in the coil section H' which includes the auxiliary coil section M' effects the desired upward movement of the armature F. The arrangement of Fig. 2 is particularly advantageous in that the adjustment of the inductance is independent of variations in frequency and voltage.

In the form of the invention illustrated in Fig. 3, the impedance ratio of the receiver coils H' and H² in any position of the magnetic body F may be varied by the adjustment of what I may call a magnetic shunt member P to thereby vary the electro-magnetic interaction between the receiver coil and the magnetic body F. As shown in Fig. 3, the magnetic shunt comprises an axially movable sleeve P of magnetic material positioned within the coil and telescopically receiving the lower end of the magnetic body F. The sleeve is supported on a non-magnetic stem P', to which an adjusting screw P² is connected. Rotation of the screw P² effects a vertical movement of the sleeve P which changes the relative electro-magnetic interaction between the armature F and the coil sections H' and H².

The incorporation in the receiving element of means for adjusting the impedance relation of the coils of that element obviously facilitates calibration of the apparatus when the receiving and transmitting elements are located at a distance from one another, since calibration may then be readily effected by adjusting the impedance relation of the receiver coils as required to bring the receiver core F into its zero position, at a time when it is known that the transmitting element is in its zero condition.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:—

1. In combination a transmitter including a movable magnetic body and coils in inductive relation therewith, a receiver element including a movable magnetic body and coils in inductive relation therewith, coil energizing and connecting means uniting with said coils and bodies to form a self-balancing impedance bridge wherein any movement of the transmitter magnetic body varying the impedance relation of the transmitter coils and thereby unbalancing the bridge, results in a movement of the receiver magnetic body which changes the impedance relation of the receiver coils and thereby rebalances the bridge, and adjustable means associated with said receiver element and operative when adjusted to vary the impedance relation of the receiver coils and thereby adjust the position assumed by the last mentioned magnetic body when the first mentioned magnetic body occupies a particular position.

2. In combination a transmitter including a movable magnetic body and coils in inductive relation therewith, a receiver element including a movable magnetic body and coils in inductive relation therewith, coil energizing and connecting means uniting with said coils and bodies to form a self-balancing impedance bridge wherein any movement of the transmitter magnetic body varying the impedance relation of the transmitter coils and thereby unbalancing the bridge, results in a movement of the receiver magnetic body which changes the impedance relation of the receiver coils and thereby rebalances the bridge, and adjustable means associated with the receiver element and operative when adjusted to vary the relative potential drops in the different receiver coils and thereby adjust the position assumed by the last mentioned magnetic body when the first mentioned magnetic body occupies a particular position.

Signed at Philadelphia, in the county of Philadelphia and State of Pennsylvania, this 25th day of July, A. D. 1929.

THOMAS R. HARRISON.